US012574769B2

(12) United States Patent (10) Patent No.: US 12,574,769 B2
Sun (45) Date of Patent: Mar. 10, 2026

(54) MEASUREMENT CONFIGURATION METHOD, DEVICE, AND SYSTEM

(71) Applicant: VIVO MOBILE COMMUNICATION CO., LTD., Dongguan (CN)

(72) Inventor: Peng Sun, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 350 days.

(21) Appl. No.: 18/136,853

(22) Filed: Apr. 19, 2023

(65) Prior Publication Data

US 2023/0262497 A1 Aug. 17, 2023

Related U.S. Application Data

(63) Continuation of application No. PCT/CN2021/124441, filed on Oct. 18, 2021.

(30) Foreign Application Priority Data

Oct. 19, 2020 (CN) .......................... 202011121087.X

(51) Int. Cl.
*H04W 24/08* (2009.01)
*H04W 24/10* (2009.01)
(52) U.S. Cl.
CPC ........... *H04W 24/08* (2013.01); *H04W 24/10* (2013.01)
(58) Field of Classification Search
CPC ..... H04W 24/08; H04W 24/10; H04W 24/02; H04B 7/0408
See application file for complete search history.

(56) References Cited

U.S. PATENT DOCUMENTS

| 2013/0324119 A1* | 12/2013 | Shi | H04W 36/0094 |
| | | | 455/434 |
| 2019/0296815 A1 | 9/2019 | Onggosanusi et al. | |
| 2021/0329507 A1* | 10/2021 | Yao | H04W 36/0085 |
| 2022/0022073 A1* | 1/2022 | Zhang | H04W 24/08 |
| 2022/0256386 A1* | 8/2022 | Kimba Dit Adamou | |
| | | | H04L 5/00 |
| 2023/0117493 A1* | 4/2023 | Li | H04W 64/00 |
| | | | 370/329 |

(Continued)

FOREIGN PATENT DOCUMENTS

| CN | 110381531 A | 10/2019 |
| CN | 110463060 A | 11/2019 |

(Continued)

OTHER PUBLICATIONS

International Search Report issued in corresponding International Application No. PCT/CN2021/124441, mailed Jan. 25, 2022, 6 pages.

(Continued)

*Primary Examiner* — Abdullahi Ahmed
(74) *Attorney, Agent, or Firm* — IPX PLLC

(57) ABSTRACT

A measurement configuration method, a device, and a system are provided. The method includes: obtaining, by UE, configuration information, where the configuration information is used to indicate measurement information of a target resource, and the measurement information includes at least one of the following: first measurement behavior, second measurement behavior, and other information; and processing, by the UE, a received signal according to the configuration information.

20 Claims, 4 Drawing Sheets

(56) References Cited

U.S. PATENT DOCUMENTS

| | | | | |
|---|---|---|---|---|
| 2023/0144979 A1* | 5/2023 | Niu | ....................... | H04W 24/10 |
| | | | | 370/329 |
| 2023/0156767 A1* | 5/2023 | Hu | ...................... | H04L 41/5009 |
| | | | | 370/329 |
| 2024/0031886 A1* | 1/2024 | Li | ....................... | H04W 56/001 |

FOREIGN PATENT DOCUMENTS

| | | | |
|---|---|---|---|
| CN | 111436059 A | 7/2020 |
| WO | 2020132617 A1 | 6/2020 |

OTHER PUBLICATIONS

Vivo, "Discussion on multi-beam enhancement", 3GPP TSG RAN WG1 #102-e, R1-2005363, Aug. 2020, 21 pages.
Sony, "Considerations on the enhancement of multi-beam operation", 3GPP TSG RAN WG1#102e, R1-2005560, Aug. 2020, 10 pages.

* cited by examiner

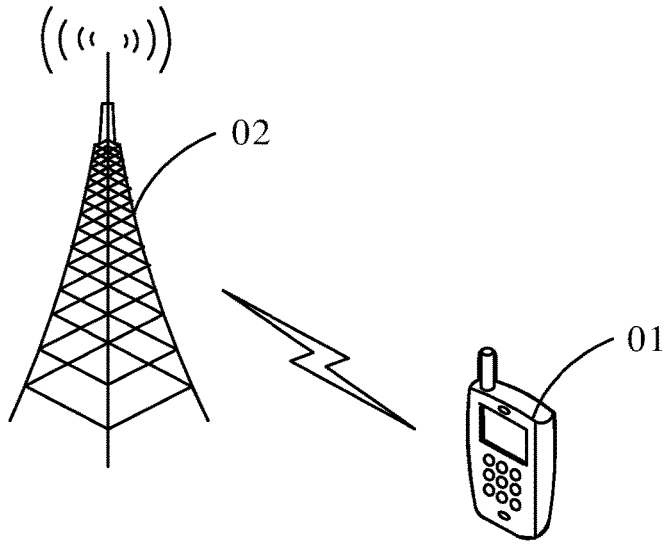

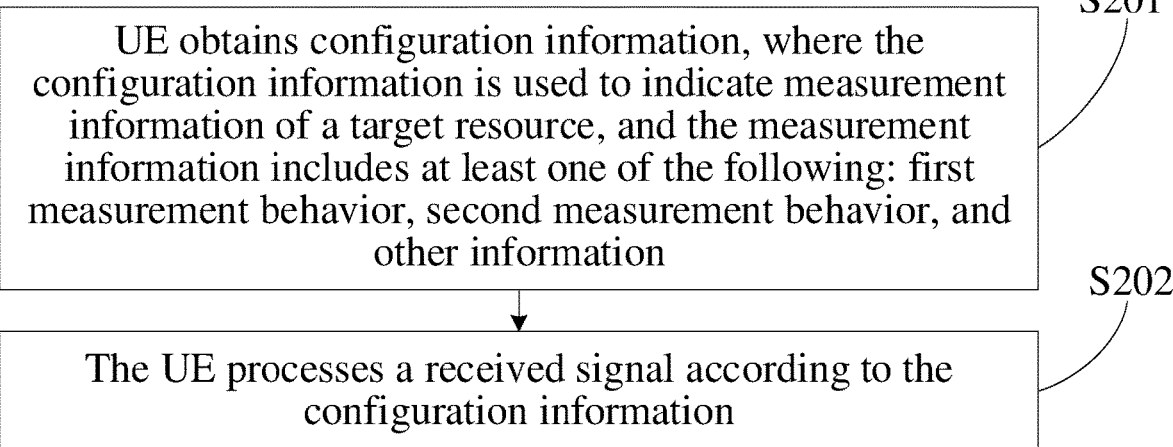

UE obtains configuration information, where the configuration information is used to indicate measurement information of a target resource, and the measurement information includes at least one of the following: first measurement behavior, second measurement behavior, and other information

S201

The UE processes a received signal according to the configuration information

MEASUREMENT CONFIGURATION METHOD, DEVICE, AND SYSTEM

CROSS-REFERENCE TO RELATED APPLICATIONS

This application is a continuation of International Application No. PCT/CN2021/124441, filed on Oct. 18, 2021, which claims priority to Chinese Patent Application No. 202011121087.X, filed on Oct. 19, 2020. The entire contents of each of the above-identified applications are expressly incorporated herein by reference.

TECHNICAL FIELD

This application relates to the field of communication technologies, and in particular, to a measurement configuration method, a device, and a system.

BACKGROUND

To improve performance of a communication system, analog beamforming technology training is usually performed, that is, array elements in each polarization direction of each antenna panel sequentially send training signals at an agreed time in a time division multiplexing manner. User Equipment (UE) feeds back a beam report to a network device after beam measurement, for the network device to determine a beam used to send a channel or a signal to the UE.

A non-serving cell relies on high-level Radio Resource Management (RRM) measurement, for example, Layer 3 (L3) measurement. In the high-level RRM measurement, a measurement result is obtained after filtering is performed on a plurality of physical layer measurement results for a plurality of times. Therefore, compared with a physical layer measurement manner, the high-level RRM measurement has a larger latency. However, some scenarios do not have strict latency requirements, while some scenarios have relatively strict latency requirements. For example, in a high-speed mobile scenario such as a high-speed rail or a highway, due to the use of high-level RRM measurement, UE cannot achieve a continuous high-speed effect, and even a service interruption occurs. Therefore, how to perform beam measurement for different scenarios becomes an urgent problem to be resolved.

SUMMARY

Embodiments of this application provide a measurement configuration method, a device, and a system.

According to a first aspect, an embodiment of this application provides a measurement configuration method. The method includes: obtaining, by UE, configuration information, where the configuration information is used to indicate measurement information of a target resource, and the measurement information includes at least one of the following: first measurement behavior, second measurement behavior, and other information; and processing, by the UE, a received signal according to the configuration information.

According to a second aspect, an embodiment of this application provides a measurement configuration method. The method includes: sending, by a network device, configuration information to UE, where the configuration information is used to indicate measurement information of a target resource, the measurement information includes at least one of the following: first measurement behavior, second measurement behavior, and other information, and the configuration information is used to process a received signal by the UE.

According to a third aspect, an embodiment of this application provides UE. The UE includes an obtaining module and a processing module. The obtaining module is configured to obtain configuration information, where the configuration information is used to indicate measurement information of a target resource, and the measurement information includes at least one of the following: first measurement behavior, second measurement behavior, and other information. The processing module is configured to process a received signal according to the configuration information obtained by the obtaining module.

According to a fourth aspect, an embodiment of this application provides a network device. The network device includes a communication module. The communication module is configured to send configuration information to UE, where the configuration information is used to indicate measurement information of a target resource, the measurement information includes at least one of the following: first measurement behavior, second measurement behavior, and other information, and the configuration information is used to process a received signal by the UE.

According to a fifth aspect, an embodiment of this application provides UE, where the UE includes a processor, a memory, and a program or an instruction stored in the memory and runnable on the processor, where when the program or the instruction is executed by the processor, the steps of the method according to the first aspect are implemented.

According to a sixth aspect, an embodiment of this application provides a network device, where the network device includes a processor, a memory, and a program or an instruction stored in the memory and runnable on the processor, where when the program or the instruction is executed by the processor, the steps of the method according to the second aspect are implemented.

According to a seventh aspect, an embodiment of this application provides a readable storage medium, where the readable storage medium stores a program or an instruction, and when the program or the instruction is executed by a processor, the steps of the method according to the first aspect or the second aspect are implemented.

According to an eighth aspect, an embodiment of this application provides a chip, where the chip includes a processor and a communication interface, the communication interface is coupled to the processor, and the processor is configured to run a program or an instruction to implement the method according to the first aspect or the second aspect.

In the embodiments of this application, UE may first obtain configuration information, where the configuration information is used to indicate measurement information of a target resource, and the measurement information includes at least one of the following: first measurement behavior, second measurement behavior, and other information; and then process a received signal according to the configuration information.

BRIEF DESCRIPTION OF THE DRAWINGS

FIG. 1 is a schematic architectural diagram of a communication system according to an embodiment of this application;

FIG. 2 is a schematic diagram of a measurement configuration method according to an embodiment of this application;

DETAILED DESCRIPTION

Figure 3:
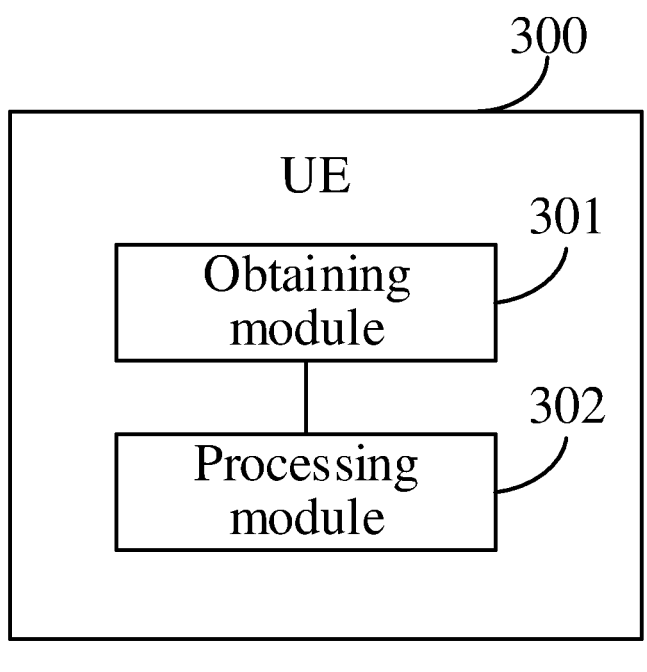
FIG. 3 is a schematic structural diagram of UE according to an embodiment of this application.

The embodiments of this application are described below with reference to the accompanying drawings in the embodiments of this application. Apparently, the described embodiments are some rather than all of the embodiments of this application. The embodiments in this application and their equivalent embodiments all fall within the protection scope of this application.

In this specification and the claims of this application, the terms "first," "second," and so on are intended to distinguish similar objects but do not necessarily indicate a specific order or sequence. It is to be understood that the data termed in such a way is interchangeable in proper circumstances, so that the embodiments of this application can be implemented in other sequences than the sequence illustrated or described herein. In addition, "and/or" in this specification and the claims indicate at least one of the connected objects, and the character "I" usually indicates an "or" relationship between the associated objects.

In the description of the embodiments of this application, unless otherwise stated, "a plurality of" means two or more. For example, a plurality of reports means two or more reports.

Terms and implementations involved in the embodiments of this application are described below.

1. RRM Measurement:

In the existing RRM measurement, UE measures a Reference Signal (RS) of a neighboring cell, and determines, according to a measurement result, whether to perform cell handover. To avoid short-term fluctuations in the measurement result, a series of uniformly distributed physical layer measurements are usually averaged within a measurement period, which may be referred to as high-level measurements, such as L3 measurements. L3 measurement is a measurement result obtained by performing L3 filtering based on a plurality of L1 measurement results.

In a case of measuring a reference signal, such as a Synchronization Signal/Physical Broadcast CHannel Block (Synchronization Signal and PBCH Block (SSB)), of a neighboring cell, a measurement window usually needs to be set to measure a timing of the SSB, that is, an SMTC needs to be set to avoid any unnecessary measurement and reduce energy loss of the measurement. A period of the Synchronization Signal/Physical Broadcast CHannel Block Measurement Timing Configuration (SS/PBCH Block Measurement Timing Configuration (SMTC)) window may be set the same as that of the SSB, for example, 5/10/20/40/80/160 ms. A measurement time interval may be set to 1/2/3/4/5 ms, or the like. The period is usually related to a quantity of sent SSBs. The UE measures the SSB according to SMTC configuration information, and then reports a measurement result to a network device, such as a base station gNB.

2. Beam Measurement and Beam Reporting:

Analog beamforming is transmission in full bandwidth, and array elements in each polarization direction on a panel of each high-frequency antenna array can send an analog beam only in a time division multiplexing manner. Weights of the analog beamforming are achieved by adjusting parameters of a radio frequency front-end phase shifter and other devices.

Analog beamforming vectors may be trained in a polling manner, that is, the array elements in each polarization direction of each antenna panel sequentially send training signals (that is, candidate forming vectors) at an agreed time in a time division multiplexing manner. The UE performs measurement and then feeds back a beam report, for a network device to use the training signal for a next transmission service to implement analog beam emission. Content of a beam report usually includes several optimal transmit beam identifiers and measured received power of each transmit beam.

During beam measurement, the network device configures a Reference Signal resource set (RS resource set), which includes at least one reference signal resource, for example, an SSB resource or a Channel State Information Reference Signal (CSI-RS) resource. The UE measures Layer 1 Reference Signal Received Power (L1-RSRP) or a Layer 1 Signal to Interference plus Noise Ratio (L1-SINR) of each RS resource, and reports at least one optimal measurement result to the network device. The reported content may include an SS/PBCH Block Resource Indicator (SSBRI) or a CSI-RS Resource Indicator (CRI), and the L1-RSRP/L1-SINR. The reported content reflects at least one optimal beam and its quality, for the network device to determine a beam used to send a channel or a signal to the UE.

3. Beam Indication

After the beam measurement and beam report, the network device may perform beam indication on downlink and uplink channels or reference signals, for establishment of a beam link between the network device and the UE, to implement transmission of the channel or the reference signal. Usually, downlink beam information can be usually represented by Transmission Configuration Indication (TCI) state information or Quasi-CoLocation (QCL) information; and uplink beam information can be usually represented by spatial relation information.

A measurement configuration method, a device, and a system provided in the embodiments of this application are described in detail below through specific embodiments and application scenarios thereof with reference to the accompanying drawings.

FIG. 1 is a schematic architectural diagram of a communication system according to an embodiment of this application. As shown in FIG. 1, the communication system may include UE 01 and a network device 02.

It should be noted that, the devices shown in FIG. 1 may be connected in a wireless or a wired manner. This is not specifically limited in this embodiment of this application and can be determined according to actual needs.

The UE is a device that provides voice and/or data connectivity to a user, a handheld device with a wired/wireless connection function, or another processing device connected to a wireless modem. The UE may communicate with one or more core network devices by using a Radio Access Network (RAN). In the embodiment of this application, the UE may be a terminal device, such as a mobile phone (or referred to as a "cellular" phone) and a computer with a mobile terminal, or may be portable, pocket-sized, hand-held, computer built-in or vehicle-mounted mobile devices that exchange speech and/or data with the RAN, for example, Personal Communication Service (PCS) phones, cordless phones, Session Initiation Protocol (SIP) phones, Wireless Local Loop (WLL) stations, Personal Digital Assistants (PDA), and other devices. The UE may also be referred to as a user agent or the like.

The network device is a device deployed in the RAN and configured to provide a wireless communication function to the UE. In this embodiment of this application, the network device may be a base station, and the base station may include various forms of macro base stations, micro base stations, relay stations, access points, and the like. In systems using different radio access technologies, names of devices with base station functions may be different. For example, in a 5th Generation wireless communication (5G) system, the device may be referred to as a gNB; in a 4th Generation wireless communication (4G) system, such as a Long Term Evolution (LTE) system, the device may be referred to as an evolved NodeB (eNB); and in a 3rd Generation mobile communication (3G) system, the device may be referred to as a Node B. As communication technologies evolve, the name "base station" may change.

Based on a communication system, such as the communication system shown in FIG. 1, an embodiment of this application provides a measurement configuration method. As shown in FIG. 2, the measurement configuration method includes S201 and S202 described below.

S201. UE obtains configuration information, where the configuration information is used to indicate measurement information of a target resource, and the measurement information includes at least one of the following: first measurement behavior, second measurement behavior, and other information.

In some implementations, the configuration information may be pre-configured, pre-agreed, or configured by a network device.

In a case that the configuration information is configured by a network device, before S201, the measurement configuration method provided in this embodiment of this application may further include: sending, by the network device, configuration information to the UE. Correspondingly, S201 includes: receiving, by the UE, the configuration information. The configuration information is used to process a received signal by the UE.

In some implementations, the target resource may include a measurement resource indicated in a Measurement Object (MO), a resource used for physical layer measurement, and the like.

In some implementations, the first measurement behavior is measuring through a single physical layer measure or a plurality of physical layers to obtain a measurement result, or may be referred to as Layer 1 (L1) measurement. For example, measurement may be performing according to a network configured manner through a single physical layer or a plurality of physical layers to obtain a measurement result.

The second measurement behavior is performing filtering on a plurality of physical layer measurement results in a pre-agreed manner to obtain a measurement result, or may be referred to as Layer 3 (L3) measurement.

In general, layer 1 refers to a physical layer, layer 2 refers to a Medium Access Control (MAC) layer, and layer 3 refers to a Radio Resource Control (RRC) layer.

In some implementations, the other information may include at least one of the following: a measurement frequency, a Physical Cell Identifier (PCI), synchronization information, target cell configuration information, QCL information, and the like.

In some implementations, in a case that the configuration information includes no PCI, a PCI of the measurement object may be a PCI of a current serving cell, that is, the PCI of the measurement object is the same as the PCI of the current serving cell.

In some implementations, the configuration information may further include information about an SSB. In this way, the UE may measure another TRP or a reference signal SSB of at least one neighboring cell according to the configuration information.

In some implementations, the configuration information may include at least one of (1) to (5):

(1) is information indicating a measurement result reporting (measurement report) manner of the target resource.

In some implementations, in a case that the configuration information is the information indicating the measurement result reporting manner of the target resource, the measurement result reporting manner of the target resource may be associated with measurement behavior for the target resource. According to the measurement result reporting manner of the target resource, it may be determined whether the measurement behavior for the target resource is the first measurement behavior or the second measurement behavior, or both the first measurement behavior and the second measurement behavior.

For example, there may be the following cases:

If the configuration information indicates that the measurement result reporting manner of the target resource is layer 1 reporting, measurement behavior associated with the measurement result reporting manner is layer 1 measurement.

If the configuration information indicates that the measurement result reporting manner of the target resource is layer 3 reporting, measurement behavior associated with the measurement result reporting manner is layer 3 measurement.

If the configuration information indicates that the measurement result reporting manner of the target resource is layer 2 reporting, according to a predefined rule or configuration, measurement behavior associated with the measurement result reporting manner is layer 1 measurement or layer 3 measurement.

If the configuration information indicates that the measurement result reporting manner of the target resource is a plurality of types of reporting manners, reference signals in the target resource are measured differently for different reporting manners. For example, if the configuration information indicates that the measurement result reporting manner of the target resource is layer 1 reporting and layer 3 reporting, the measurement behavior for the target resource is layer 1 measurement and layer 3 measurement.

(2) is control signaling explicitly/directly indicating measurement behavior. The control signaling may be Radio Resource Control (RRC) signaling, or a Medium Access Control Control Element (MAC CE), or physical layer control signaling (Downlink Control Information (DCI)).

In a case that the configuration information is control signaling explicitly indicating measurement behavior, the measurement behavior for the target resource may further be associated with the measurement result reporting manner of the target resource, that is, the control signaling may be further associated with the measurement result reporting manner of the target resource. The network device may indicate the measurement behavior and the measurement result reporting manner of the target resource by delivering control signaling.

In some implementations, there may be the following cases:

If the control signaling directly indicates that the measurement behavior for the target resource is layer 3 measurement, the layer 3 measurement is associated with layer 3 reporting, that is, associated with one layer 3 reporting through the control information.

If the control signaling directly indicates that the measurement behavior for the target resource is layer 1 measurement, the layer 1 measurement is associated with layer 1 reporting, that is, associated with one layer 1 reporting through the control information.

If the control signaling directly indicates that the measurement behavior for the target resource is layer 1 measurement or layer 3 measurement, the layer 1 measurement or the layer 3 measurement may be further associated with layer 2 reporting, that is, associated with the layer 2 reporting through the control information.

In some implementations, the control information may be used to indicate that the measurement manner of the target resource is layer 3 measurement and layer 1 measurement, that is, the target resource may be indicated as both layer 3 measurement and layer 1 measurement.

In some implementations, when the control signaling is a MAC CE, a measurement manner indicated by the MAC CE needs to be configured with corresponding information in advance by RRC signaling and associated with a plurality of reporting configurations at the same time. According to the case that the indicated measurement manner is layer 3 measurement or layer 1 measurement, the corresponding measurement behavior and reporting method are respectively activated.

For example, it is assumed that one MO is configured in advance to be associated with one or more layer 3 reportings, and the MO is also associated with one or more layer 1 reportings. If the MAC CE selects layer 3 measurement as measurement behavior for the MO, a measurement result reporting manner of the MO is layer 3 reporting. If the MAC CE selects layer 1 measurement as measurement behavior for the MO, a measurement result reporting manner of the MO is layer 1 reporting. If the MAC CE selects layer 3 measurement and layer 1 measurement as measurement behavior for the MO, a measurement result reporting manner of the MO is layer 3 reporting and layer 1 reporting, that is, a plurality of measurement result reporting manners are triggered at the same time.

In some implementations, the control signaling may further include at least one of the following: frequency information, measurement time information, PCI information, RS IDentifier (RS ID) information, and the like. Such information in the target resource can be replaced through control signaling.

(3) is a configuration manner of the target resource. The configuration manner includes: configuring the target resource in the measurement object or configuring the target resource in a physical layer measurement resource.

For example, if the configuration manner of the target resource is configuring the target resource in the measurement object, measurement behavior for the target resource is layer 3 measurement. If the configuration manner of the target resource is configuring the target resource in a physical layer measurement resource, measurement behavior for the target resource is layer 1 measurement. If the configuration manner of the target resource is configuring the target resource in the measurement object and configuring the target resource in the physical layer measurement resource, measurement behavior for the target resource is layer 3 measurement and layer 1 measurement.

(4) is information about a first target resource indicated in first information. The first information may be used to indicate QCL of a channel or QCL of a reference signal.

In this embodiment of this application, when QCL information of a channel or an RS is indicated through the first information, an MO may be referenced/indicated in the QCL information (for example, in a TCI state) (for example, an MO ID is indicated), thereby indicating a measurement manner of the corresponding RS.

In some implementations, if the configuration information is the information about the first target resource indicated in the first information, measurement behavior for the first target resource is determined through at least one of the following: a measurement result reporting manner of the first target resource, RRC signaling or a MAC CE, and the first information.

That the measurement behavior for the first target resource is determined through the first information is used as an example for description. If the first information indicates that the measurement behavior for the first target resource is layer 1 measurement, the UE may measure the first target resource according to the layer 1 measurement. If the first information indicates that the measurement behavior for the first target resource is layer 3 measurement, the UE may measure the first target resource according to the layer 3 measurement. If the first information indicates that the measurement behavior for the first target resource is layer 1 measurement and layer 3 measurement, the UE may measure the first target resource according to the layer 1 measurement and the layer 3 measurement.

In some implementations, in an implementation, the other information may include at least one of the following: a measurement frequency, a PCI, a Transmission and Reception Point (TRP) ID, an RS ID, QCL, and other information. For example, in a TCI state configuration, an MO ID is directly given. In another implementation, some information may be indicated/referenced by other information, and some other information may be explicitly indicated through a configuration. For example, information such as a frequency is indicated by an MO, and information such as a PCI, a TRP ID, or an RS ID is explicitly indicated through an additional configuration.

In some implementations, an association relationship between an RS and an MO may be replaced through a MAC CE.

(5) is information about a second target resource indicated in second information. The second information may be used to indicate information related to reporting of a measurement result.

In this embodiment of this application, when the configuration information is indicating, in the second information, a measurement resource associated with layer 1 reporting or layer 2 reporting or layer 3 reporting, whether the measurement resource corresponding the reporting is layer 1 measurement or layer 3 measurement for a target cell is indicated by referencing an MO (for example, through an MO ID).

In some implementations, if the configuration information is the information about the second target resource indicated in the second information, measurement behavior for the second target resource is determined through at least one of the following: a measurement result reporting manner of the second target resource, RRC signaling or a MAC CE, and the second information.

That the measurement behavior for the second target resource is determined through the measurement result reporting manner of the second target resource is used as an example for description. If the second information indicates that the measurement result reporting manner of the second target resource is layer 1 reporting, because the layer 1 reporting is associated with layer 1 measurement, the UE may measure the second target resource according to the layer 1 measurement, and report a measurement result of the layer 1 measurement according to the layer 1 reporting. If the second information indicates that the measurement result reporting manner of the second target resource is layer 3 reporting, because the layer 3 reporting is associated with layer 3 measurement, the UE may measure the second target resource according to the layer 3 measurement, and report a measurement result of the layer 3 measurement according to the layer 3 reporting. If the second information indicates that the measurement result reporting manner of the second target resource is layer 1 reporting and layer 3 reporting, because the layer 1 reporting is associated with layer 1 measurement and the layer 3 reporting is associated with layer 3 measurement, the UE may measure the second target resource according to the layer 1 measurement and layer 3 measurement, then report a measurement result of the layer 1 measurement according to the layer 1 reporting, and report a measurement result of the layer 3 measurement according to the layer 3 reporting.

In some implementations, in an implementation, the other information may include at least one of the following: a measurement frequency, a PCI, a TRP ID, an RS ID, QCL, and other information. For example, in a TCI state configuration, an MO ID is directly given. In another implementation, some information may be indicated/referenced by other information, and some other information may be explicitly indicated through a configuration. For example, information such as a frequency is indicated by an MO, and information such as a PCI, a TRP ID, or an RS ID is explicitly indicated through an additional configuration.

In some implementations, an association relationship between a measurement result reporting manner and an MO may be replaced through a MAC CE.

S202. The UE processes a received signal according to the configuration information.

In some implementations, according to the configuration information, S202 may be implemented in the following implementations.

Implementation 1

In this implementation, S202 may be implemented through S202a below.

S202a. The UE determines, according to the configuration information, that the configuration information indicates the first measurement behavior, or that the configuration information indicates the second measurement behavior, or that the configuration information indicates the first measurement behavior and the second measurement behavior.

In a case that the configuration information is used to indicate that the measurement behavior for the target resource is the first measurement behavior, the UE may determine, according to the configuration information, that the measurement behavior indicated by the configuration information is the first measurement behavior. In a case that the configuration information is used to indicate that the measurement behavior for the target resource is the second measurement behavior, the UE may determine, according to the configuration information, that the measurement behavior indicated by the configuration information is the second measurement behavior. In a case that the configuration information is used to indicate that the measurement behavior for the target resource is the first measurement behavior and the second measurement behavior, the UE may determine, according to the configuration information, that the measurement behavior indicated by the configuration information is the first measurement behavior and the second measurement behavior.

It should be noted that, for an implementation in which the UE determines, according to the configuration information, which measurement behavior the measurement behavior indicated by the configuration information is, reference may be made to the specific description in (1) to (5) of S201. Details are not described herein again.

Implementation 2

In this implementation, S202 may be implemented through S202b1 below. After S202b1, the measurement configuration method provided in this embodiment of this application may further include S202b2 below.

S202b1. The UE measures a target resource of the received signal according to measurement behavior indicated by the configuration information.

S202b2. The UE sends a measurement result of the target resource to a network device according to a measurement result reporting manner indicated by the configuration information.

Correspondingly, the network device receives the measurement result of the target resource sent by the UE. The measurement result is reported by the UE according to the measurement result reporting manner indicated by the configuration information and after measuring the target resource of the received signal according to the measurement behavior indicated by the configuration information.

That the UE measures a target resource of the received signal according to measurement behavior indicated by the configuration information may include any one of the following: in a case that the configuration information indicates the first measurement behavior, measuring the target resource of the received signal according to the first measurement behavior; in a case that the configuration information indicates the second measurement behavior, measuring the target resource of the received signal according to the second measurement behavior; or in a case that the configuration information indicates the first measurement behavior and the second measurement behavior, measuring the target resource of the received signal according to the first measurement behavior and the second measurement behavior.

It can be understood that, in addition to including the target resource, the received signal may further include a channel and other resources.

In some implementations, for Implementation 2, the UE may first determine that the configuration information indicates the first measurement behavior, or that the configuration information indicates the second measurement behavior, or that the configuration information indicates the first measurement behavior and the second measurement behavior; then measure the target resource of the received signal according to the measurement behavior indicated by the configuration information; and subsequently, send the measurement result of the target resource to the network device according to the measurement result reporting manner indicated by the configuration information. That is, the UE may first perform S202a, and then perform S202b.

In some implementations, the measurement result reporting manner of the target resource includes at least one of the following: layer 1 reporting, layer 2 reporting, and layer 3 reporting. The first measurement behavior may be associated with the layer 1 reporting or the layer 2 reporting, and the second measurement behavior may be associated with the layer 3 reporting or the layer 2 reporting.

In some implementations, the layer 1 reporting is reporting through Uplink Control Information (UCI), the layer 2 reporting is reporting through a MAC CE, and the layer 3 reporting is reporting through RRC signaling.

For example, if the UE is located in a high-speed mobile scenario, the network device may send configuration information to the UE, where the configuration information is used to indicate that the measurement behavior for the target resource is L1 measurement. In this case, the UE may measure the target resource of the received signal according to the L1 measurement, and send a measurement result of the L1 measurement to the network device according to L1 reporting. In this way, a service transmission latency is reduced, so that the UE can achieve a continuous high-speed effect and power of the UE is saved. If the UE is located in a non-high-speed mobile scenario, the network device may send configuration information to the UE, where the configuration information is used to indicate that the measurement behavior for the target resource is L3 measurement. In this case, the UE may measure the target resource of the received signal according to the L3 measurement, and send a measurement result of the L3 measurement to the network device according to L3 reporting, so that short-term fluctuations in the measurement result can be avoided, thereby making the measurement result of the target resource more accurate and ensuring normal transmission of a service.

It should be noted that, both the high-speed mobile scenario and the non-high-speed mobile scenario are exemplarily illustrative. The measurement configuration method provided in this embodiment of this application may be further applied to another scenario, which may be determined according to actual usage requirements. This is not limited in this embodiment of this application.

Implementation 3

In this implementation, S202 may be implemented through S202c or S202d below.

S202c. In a case that the measurement behavior and/or the other information indicated by the configuration information meets a first preset condition, the UE measures a target resource of the received signal within a measurement time according to the measurement behavior indicated by the configuration information.

S202d. In a case that the measurement behavior and/or the other information indicated by the configuration information does not meet a first preset condition, the UE measures a target resource of the received signal within or outside a measurement time according to the measurement behavior indicated by the configuration information. That is, the UE can measure the target resource of the received signal at any time, regardless of the measurement time, according to the measurement behavior indicated by the configuration information.

In some implementations, the measurement time may be agreed or configured.

In some implementations, the measurement time may be an SMTC.

In some implementations, that the measurement behavior and/or the other information indicated by the configuration information meets a first preset condition includes at least one of the following:

c1. Measurement behavior for the target resource is the first measurement behavior or the second measurement behavior.

In an implementation, when the measurement behavior for the target resource indicated by the configuration information is the first measurement behavior, it may be considered that the measurement behavior for the target resource meets the first preset condition. When the measurement behavior for the target resource indicated by the configuration information is the second measurement behavior, it may be considered that the measurement behavior for the target resource does not meet the first preset condition.

In another implementation, when the measurement behavior for the target resource indicated by the configuration information is the second measurement behavior, it may be considered that the measurement behavior for the target resource meets the first preset condition. When the measurement behavior for the target resource indicated by the configuration information is the first measurement behavior, it may be considered that the measurement behavior for the target resource does not meet the first preset condition.

c2. The target resource is associated with a measurement object, or the target resource is associated with no measurement object. That is, the UE may determine, according to the other information indicating whether the target resource is associated with the measurement object, whether to follow, within the measurement time, the measurement behavior indicated by the configuration information.

In an implementation, when the other information indicates that the target resource is associated with the measurement object, it may be considered that the measurement behavior for the target resource meets the first preset condition, and the target resource is measured within the measurement time according to the measurement behavior indicated by the configuration information. When the other information indicates that the target resource is associated with no measurement object, it may be considered that the measurement behavior for the target resource does not meet the first preset condition. Therefore, the measurement of the target resource is not limited by the measurement time.

In another implementation, when the other information indicates that the target resource is associated with no measurement object, it may be considered that the measurement behavior for the target resource meets the first preset condition, and the target resource is measured within the measurement time according to the measurement behavior indicated by the configuration information. When the other information indicates that the target resource is associated with the measurement object, it may be considered that the measurement behavior for the target resource does not meet the first preset condition. Therefore, the measurement of the target resource is not limited by the measurement time.

c3. The target resource is associated with a current serving cell, or a target resource is associated with no current serving cell. That is, the UE may determine, according to the other information indicating whether the target resource is associated with the current serving cell, whether to follow, within the measurement time, the measurement behavior indicated by the configuration information.

For an implementation of c3, refer to the description in c2. Details are not described herein again.

c4. A measurement object associated with the target resource is configured with an SMTC or configured with no SMTC. That is, the UE may determine, according to the other information indicating whether the measurement object associated with the target resource is configured with an SMTC, whether to follow, within the measurement time, the measurement behavior indicated by the configuration information.

In some implementations, when the other information indicates that the measurement object associated with the target resource is configured with an SMTC, it may be considered that the measurement behavior for the target resource meets the first preset condition, and the target resource is measured within the SMTC according to the measurement behavior indicated by the configuration information. When the other information indicates that the measurement object associated with the target resource is configured with no SMTC, it may be considered that the measurement behavior for the target resource does not meet the first preset condition. Therefore, the measurement of the target resource is not limited by the SMTC.

c5. The configuration information indicating the measurement behavior is a preset type of configuration information.

When the configuration information of the measurement behavior indicated by the other information is a preset type of configuration information, it may be considered that the measurement behavior for the target resource meets the first preset condition, and the target resource is measured within the measurement time according to the measurement behavior indicated by the configuration information.

c6. A type of a reference signal corresponding to the target resource is a preset type.

When the type of the reference signal corresponding to the target resource and indicated by the other information is the preset type, it may be considered that the measurement behavior for the target resource meets the first preset condition, and the target resource is measured within the measurement time according to the measurement behavior indicated by the configuration information.

When the type of the reference signal corresponding to the target resource and indicated by the other information is not the preset type, it may be considered that the measurement behavior for the target resource does not meet the first preset condition. Therefore, the measurement of the target resource is not limited by the measurement time.

c7. A measurement result reporting manner associated with the target resource is a preset reporting manner.

When the measurement result reporting manner associated with the target resource and indicated by the other information is a preset reporting manner (for example, layer 1 reporting, layer 2 reporting, or layer 3 reporting), it may be considered that the measurement behavior for the target resource meets the first preset condition, and the target resource is measured within the measurement time according to the measurement behavior indicated by the configuration information.

When the measurement result reporting manner associated with the target resource and indicated by the other information is not a preset reporting manner, it may be considered that the measurement behavior for the target resource does not meet the first preset condition. Therefore, the measurement of the target resource is limited by the measurement time.

c8. Control signaling explicitly indicating the measurement behavior also indicates the measurement time, where the control signaling is RRC signaling, a MAC CE, or DCI.

If the control signaling explicitly indicating the measurement behavior also indicates the measurement time, it may be considered that the measurement behavior for the target resource meets the first preset condition, and the target resource is measured within the measurement time according to the measurement behavior indicated by the configuration information. Otherwise, it may be considered that the measurement behavior for the target resource does not meet the first preset condition. Therefore, the measurement of the target resource is not limited by the measurement time.

c9. A configuration manner of the target resource is a preset configuration manner, where the preset configuration manner includes: configuring the target resource in a measurement object or configuring the target resource in a physical layer measurement resource.

c10. Information about a first target resource indicated in first information is first preset information, where the first information is used to indicate QCL of a channel or QCL of a reference signal.

c11. Information about a second target resource indicated in second information is second preset information, where the second information is used to indicate information related to reporting of a measurement result.

For an implementation of each of c9 to c11, refer to the description in c8. Details are not described herein again.

Implementation 4

In this implementation, S202 may be implemented through S202e below.

S202e. In a case that a second preset condition is met, the UE performs at least one of the following:

e1. receiving, by the UE, another signal while measuring the target resource;

e2. performing, by the UE, rate matching or puncturing on a signal received during resource measurement;

e3. receiving, by the UE, another signal before or after receiving a measurement signal; and e4. receiving, by the UE, a signal according to a reception time within or outside a predefined range.

In some implementations, the second preset condition includes at least one of the following:

a measurement time of the target resource falls within or outside an SMTC;

measurement behavior for the target resource is the first measurement behavior or the second measurement behavior; and reception times of a plurality of received signals corresponding to the target resource fall within the predefined range.

In some implementations, the second preset condition may further include other preset conditions than the foregoing preset conditions.

Further, that the reception times of the plurality of received signals fall within the predefined range includes: a reception time difference of the plurality of signals falls within a Cyclic Prefix (CP) range.

It can be understood that, in a case that the second preset condition is not met, the UE may not need to perform e1 to e4.

In the measurement configuration method provided in this embodiment of this application, the UE may first obtain configuration information, where the configuration information is used to indicate measurement information of a target resource, and the measurement information includes at least one of the following: first measurement behavior, second measurement behavior, and other information; and then process a received signal according to the configuration information. In this solution, the configuration information can be used to indicate different measurement behavior for the target resource or indicate other information. Therefore, through obtaining the configuration information, the UE can perform different processing behavior on the received signal according to the configuration information, for example, measure the target resource according to the first measurement behavior or the second measurement behavior. In this way, measurement requirements in different scenarios are met.

As shown in FIG. 3, an embodiment of this application provides UE 300. The UE includes an obtaining module 301 and a processing module 302. The obtaining module 301 may be configured to obtain configuration information, where the configuration information may be used to indicate measurement information of a target resource, and the measurement information may include at least one of the following: first measurement behavior, second measurement behavior, and other information. The processing module 302 may be configured to process a received signal according to the configuration information obtained by the obtaining module 301.

In some implementations, the configuration information may include at least one of the following:

information indicating a measurement result reporting manner of the target resource;

control signaling explicitly indicating measurement behavior, where the control signaling is RRC signaling, or a MAC CE, or DCI;

a configuration manner of the target resource, where the configuration manner includes: configuring the target resource in a measurement object or configuring the target resource in a physical layer measurement resource;

information about a first target resource indicated in first information, where the first information is used to indicate QCL of a channel or QCL of a reference signal; and information about a second target resource indicated in second information, where the second information is used to indicate information related to reporting of a measurement result.

In some implementations, the processing module 302 may be configured to measure, according to measurement behavior indicated by the configuration information, a target resource of the received signal.

In some implementations, the UE provided in this embodiment of this application may further include a sending module 303. The sending module 303 is configured to: after the target resource of the received signal is measured, send a measurement result of the target resource to a network device according to a measurement result reporting manner indicated by the configuration information. The measurement result reporting manner includes at least one of the following: layer 1 reporting, layer 2 reporting, and layer 3 reporting.

In some implementations, the first measurement behavior is associated with the layer 1 reporting or the layer 2 reporting, and the second measurement behavior is associated with the layer 3 reporting or the layer 2 reporting.

In some implementations, the layer 1 reporting is reporting through UCI, the layer 2 reporting is reporting through a MAC CE, and the layer 3 reporting is reporting through RRC signaling.

In some implementations, if the configuration information is the information about the first target resource indicated in the first information, measurement behavior for the first target resource may be determined through at least one of the following: a measurement result reporting manner of the first target resource, RRC signaling or a MAC CE, and the first information.

In some implementations, if the configuration information is the information about the second target resource indicated in the second information, measurement behavior for the second target resource may be determined through at least one of the following: a measurement result reporting manner of the second target resource, RRC signaling or a MAC CE, and the second information.

In some implementations, the configuration information may include information about an SSB.

In some implementations, the first measurement behavior is measuring through a single physical layer or a plurality of physical layers to obtain a measurement result, or performing layer 1 measurement; and the second measurement behavior is performing filtering on a plurality of physical layer measurement results in a pre-agreed manner to obtain a measurement result, or performing layer 3 measurement.

In some implementations, the processing module 302 may be configured to:

in a case that the measurement behavior and/or the other information indicated by the configuration information meets a first preset condition, measure a target resource of the received signal within a measurement time according to the measurement behavior indicated by the configuration information; or in a case that the measurement behavior and/or the other information indicated by the configuration information does not meet a first preset condition, measure a target resource of the received signal within or outside a measurement time according to the measurement behavior indicated by the configuration information. The measurement time is agreed or configured.

In some implementations, that the measurement behavior and/or the other information indicated by the configuration information meets a first preset condition includes at least one of the following:

measurement behavior for the target resource is the first measurement behavior or the second measurement behavior;

the target resource is associated with a measurement object, or the target resource is associated with no measurement object;

the target resource is associated with a current serving cell, or a target resource is associated with no current serving cell;

a measurement object associated with the target resource is configured with an SMTC or configured with no SMTC;

the configuration information indicating the measurement behavior is a preset type of configuration information;

a type of a reference signal corresponding to the target resource is a preset type;

a measurement result reporting manner associated with the target resource is a preset reporting manner;

control signaling explicitly indicating the measurement behavior also indicates the measurement time, where the control signaling is RRC signaling, a MAC CE, or DCI;

a configuration manner of the target resource is a preset configuration manner, where the preset configuration manner includes: configuring the target resource in a measurement object or configuring the target resource in a physical layer measurement resource;

information about a first target resource indicated in first information is first preset information, where the first information is used to indicate QCL of a channel or QCL of a reference signal; and information about a second target resource indicated in second information is second preset information, where the second information is used to indicate information related to reporting of a measurement result.

In some implementations, the measurement time is an SMTC.

In some implementations, the other information includes at least one of the following: a measurement frequency, a PCI, synchronization information, target cell configuration information, and QCL information.

In some implementations, in a case that the configuration information includes no PCI, a PCI of the measurement object is a PCI of a current serving cell.

In some implementations, the processing module 302 may be configured to: in a case that a second preset condition is met, perform at least one of the following:

receiving another signal while measuring the target resource;

performing rate matching or puncturing on a signal received during resource measurement;

receiving another signal before or after receiving a measurement signal; and receiving a signal according to a reception time within or outside a predefined range.

In some implementations, the second preset condition may include at least one of the following:

a measurement time of the target resource falls within or outside an SMTC;

measurement behavior for the target resource is the first measurement behavior or the second measurement behavior; and reception times of a plurality of received signals corresponding to the target resource fall within the predefined range.

In some implementations, that the reception times of the plurality of received signals fall within the predefined range includes: a reception time difference of the plurality of signals falls within a CP range.

The UE provided in this embodiment of this application can implement the processes implemented by UE in the foregoing method embodiment. To avoid repetition, details are not described herein again.

The UE provided in this embodiment of this application may first obtain configuration information, where the configuration information is used to indicate measurement information of a target resource, and the measurement information includes at least one of the following: first measurement behavior, second measurement behavior, and other information; and then process a received signal according to the configuration information. In this solution, the configuration information can be used to indicate different measurement behavior for the target resource or indicate other information. Therefore, through obtaining the configuration information, the UE can perform different processing behavior on the received signal according to the configuration information, for example, measure the target resource according to the first measurement behavior or the second measurement behavior. In this way, measurement requirements in different scenarios are met.

Figure 4:
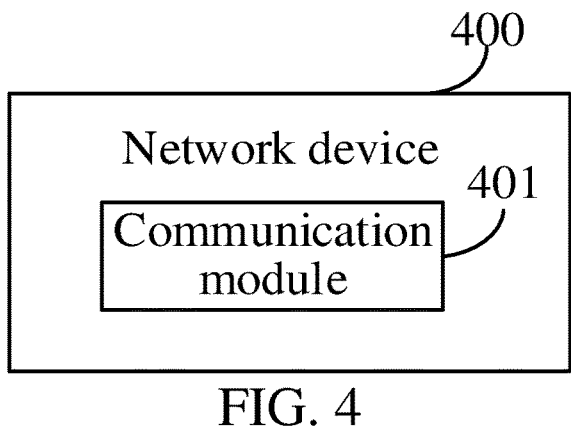
FIG. 4 is a schematic structural diagram of a network device according to an embodiment of this application.

As shown in FIG. 4, an embodiment of this application provides a network device 400. The network device may include a communication module 401. The communication module 401 may be configured to send configuration information to UE, where the configuration information may be used to indicate measurement information of a target resource, the measurement information may include at least one of the following: first measurement behavior, second measurement behavior, and other information, and the configuration information may be used to process a received signal by the UE.

In some implementations, the configuration information may include at least one of the following:

information indicating a measurement result reporting manner of the target resource;

control signaling explicitly indicating measurement behavior, where the control signaling is RRC signaling, or a MAC CE, or DCI;

a configuration manner of the target resource, where the configuration manner may include: configuring the target resource in a measurement object or configuring the target resource in a physical layer measurement resource;

information about a first target resource indicated in first information, where the first information may be used to indicate QCL of a channel or QCL of a reference signal; and information about a second target resource indicated in second information, where the second information may be used to indicate information related to reporting of a measurement result.

In some implementations, the communication module 401 may be further configured to receive a measurement result of the target resource sent by the UE. The measurement result may be reported by the UE according to a measurement result reporting manner indicated by the configuration information and after measuring a target resource of the received signal according to measurement behavior indicated by the configuration information.

In some implementations, the measurement result reporting manner may include at least one of the following: layer 1 reporting, layer 2 reporting, and layer 3 reporting.

In some implementations, the first measurement behavior is associated with the layer 1 reporting or the layer 2 reporting, and the second measurement behavior is associated with the layer 3 reporting or the layer 2 reporting.

In some implementations, the layer 1 reporting is reporting through UCI, the layer 2 reporting is reporting through a MAC CE, and the layer 3 reporting is reporting through RRC signaling.

In some implementations, if the configuration information is the information about the first target resource indicated in the first information, measurement behavior for the first target resource may be determined through at least one of the following: a measurement result reporting manner of the first target resource, RRC signaling or a MAC CE, and the first information.

In some implementations, if the configuration information is the information about the second target resource indicated in the second information, measurement behavior for the second target resource may be determined through at least one of the following: a measurement result reporting manner of the second target resource, RRC signaling or a MAC CE, and the second information.

In some implementations, the configuration information may include information about an SSB.

In some implementations, the first measurement behavior is measuring through a single physical layer or a plurality of physical layers to obtain a measurement result, or performing layer 1 measurement. The second measurement behavior is performing filtering on a plurality of physical layer measurement results in a pre-agreed manner to obtain a measurement result, or performing layer 3 measurement.

In some implementations, the other information may include at least one of the following: a measurement frequency, a PCI, synchronization information, target cell configuration information, and QCL information.

In some implementations, in a case that the configuration information includes no PCI, a PCI of the measurement object is a PCI of a current serving cell.

The network device provided in this embodiment of this application can implement the processes implemented by a network device in the foregoing method embodiment. To avoid repetition, details are not described herein again.

The network device provided in this embodiment of this application may send configuration information to UE, where the configuration information is used to indicate measurement information of a target resource, and the measurement information includes at least one of the following: first measurement behavior, second measurement behavior, and other information. Therefore, through receiving the configuration information, the UE can perform different processing behavior on the received signal according to the configuration information, for example, measure the target resource according to the first measurement behavior or the second measurement behavior. In this way, measurement requirements in different scenarios are met.

In some implementations, an embodiment of this application further provides UE, including a processor, a memory, and a program or an instruction stored in the memory and runnable on the processor, where when the program or the instruction is executed by the processor, the processes of the embodiments of the measurement configuration method are implemented, and the same technical effects can be achieved. To avoid repetition, details are not described herein again.

In some implementations, an embodiment of this application further provides a network device, including a processor, a memory, and a program or an instruction stored in the memory and runnable on the processor, where when the program or the instruction is executed by the processor, the processes of the embodiments of the measurement configuration method are implemented, and the same technical effects can be achieved. To avoid repetition, details are not described herein again.

Figure 5:
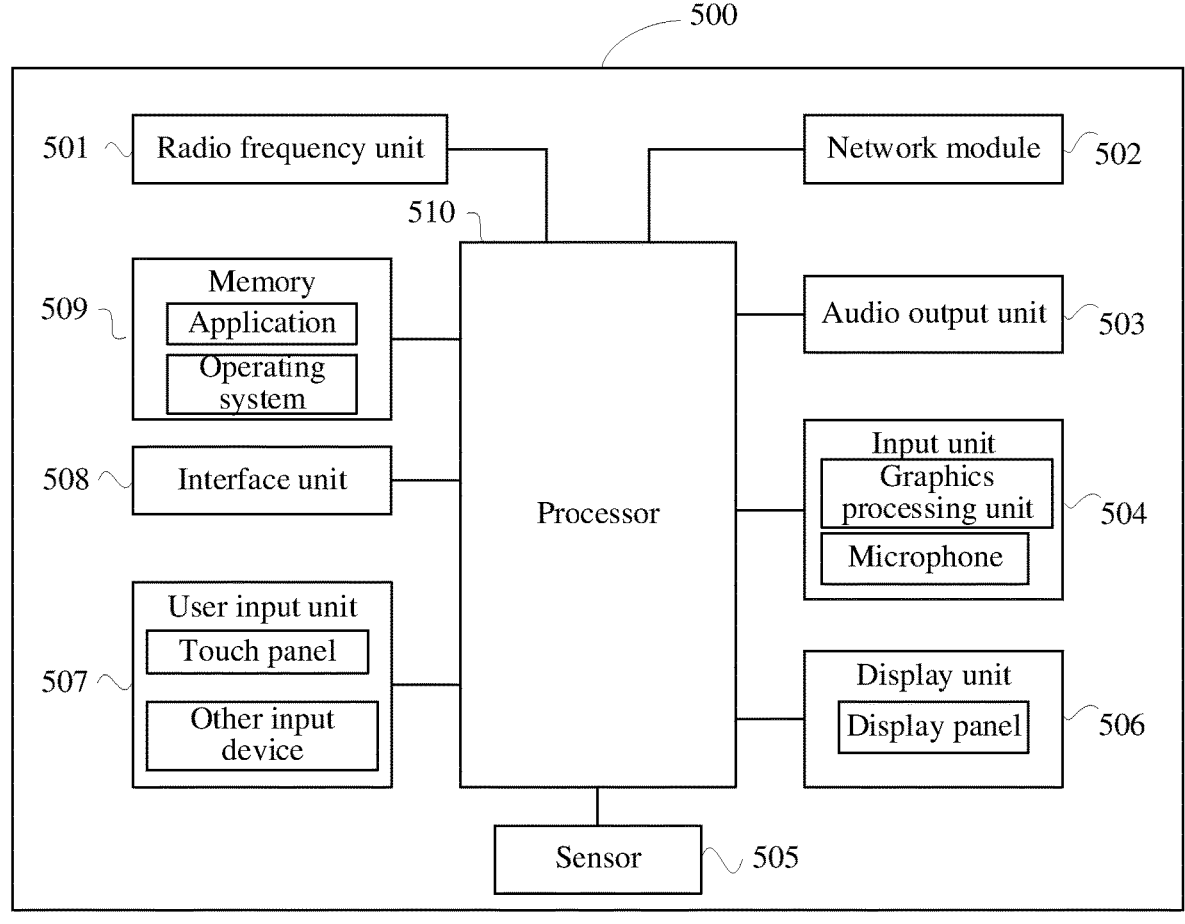
FIG. 5 is a schematic hardware diagram of UE according to an embodiment of this application.

FIG. 5 is a schematic diagram of a hardware structure of UE according to an embodiment of this application. The UE 500 includes, but is not limited to: a radio frequency unit 501, a network module 502, an audio output unit 503, an input unit 504, a sensor 505, a display unit 506, a user input unit 507, an interface unit 508, a memory 509, a processor 510, and other components.

A person skilled in the art may understand that, the UE 500 may further include a power supply (such as a battery) for supplying power to each component. The power supply may be logically connected to the processor 510 by using a power management system, thereby implementing functions, such as charging, discharging, and power consumption management, by using the power management system. The structure of the UE shown in FIG. 5 does not constitute any limitation on the UE. The UE may include more or fewer components than those shown in the figure, or some components may be combined, or different component deployments may be used. Details are not described herein again.

The processor 510 may be configured to obtain configuration information, where the configuration information may be used to indicate measurement information of a target resource, and the measurement information may include at least one of the following: first measurement behavior, second measurement behavior, and other information; and process a received signal according to the configuration information.

In some implementations, the processor 510 may be configured to measure, according to measurement behavior indicated by the configuration information, a target resource of the received signal. The radio frequency unit 501 may be configured to send a measurement result of the target resource to a network device according to a measurement result reporting manner indicated by the configuration information. The measurement result reporting manner includes at least one of the following: layer 1 reporting, layer 2 reporting, and layer 3 reporting.

In some implementations, the processor 510 may be configured to:

in a case that the measurement behavior and/or the other information meets a first preset condition, measure a target resource of the received signal within a measurement time according to the measurement behavior indicated by the configuration information; or in a case that the measurement behavior and/or the other information does not meet a first preset condition, measure a target resource of the received signal within or outside a measurement time according to the measurement behavior indicated by the configuration information. The measurement time is agreed or configured.

In some implementations, that the measurement behavior and/or the other information indicated by the configuration information meets a first preset condition includes at least one of the following:

measurement behavior for the target resource is the first measurement behavior or the second measurement behavior;

the target resource is associated with a measurement object, or the target resource is associated with no measurement object;

the target resource is associated with a current serving cell, or a target resource is associated with no current serving cell;

a measurement object associated with the target resource is configured with an SMTC or configured with no SMTC;

the configuration information indicating the measurement behavior is a preset type of configuration information;

a type of a reference signal corresponding to the target resource is a preset type;

a measurement result reporting manner associated with the target resource is a preset reporting manner;

control signaling explicitly indicating the measurement behavior also indicates the measurement time, where the control signaling is RRC signaling, a MAC CE, or DCI;

a configuration manner of the target resource is a preset configuration manner, where the preset configuration manner includes: configuring the target resource in a measurement object or configuring the target resource in a physical layer measurement resource;

information about a first target resource indicated in first information is first preset information, where the first information is used to indicate QCL of a channel or QCL of a reference signal; and information about a second target resource indicated in second information is second preset information, where the second information is used to indicate information related to reporting of a measurement result.

In some implementations, the processor 510 may be configured to: in a case that a second preset condition is met, perform at least one of the following:

receiving another signal while measuring the target resource;

performing rate matching or puncturing on a signal received during resource measurement;

receiving another signal before or after receiving a measurement signal; and receiving a signal according to a reception time within or outside a predefined range.

In some implementations, the second preset condition may include at least one of the following:

a measurement time of the target resource falls within or outside an SMTC;

measurement behavior for the target resource is the first measurement behavior or the second measurement behavior; and reception times of a plurality of received signals corresponding to the target resource fall within the predefined range.

The UE provided in this embodiment of this application may first obtain configuration information, where the configuration information is used to indicate measurement information of a target resource, and the measurement information includes at least one of the following: first measurement behavior, second measurement behavior, and other information; and then process a received signal according to the configuration information. In this solution, the configuration information can be used to indicate different measurement behavior for the target resource or indicate other information. Therefore, through obtaining the configuration information, the UE can perform different processing behavior on the received signal according to the configuration information, for example, measure the target resource according to the first measurement behavior or the second measurement behavior. In this way, measurement requirements in different scenarios are met.

Figure 6:
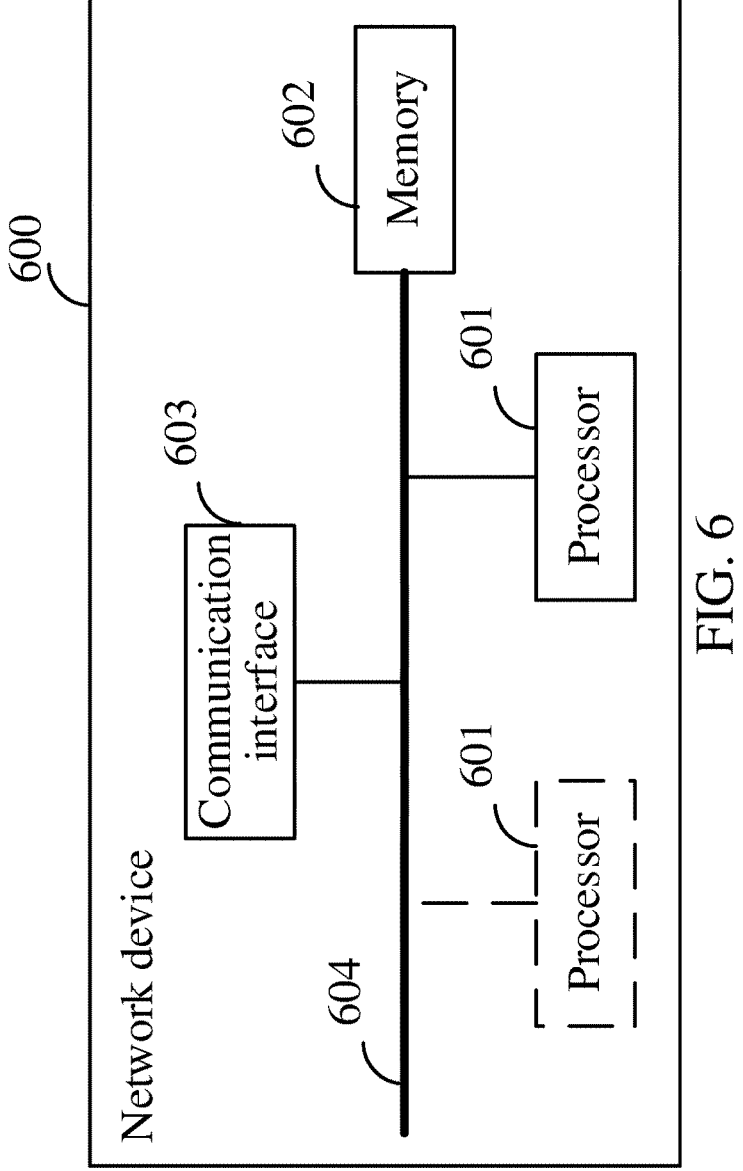
FIG. 6 is a schematic hardware diagram of a network device according to an embodiment of this application.

FIG. 6 is a schematic diagram of a hardware structure of a network device according to an embodiment of this application. As shown in FIG. 6, the network device 600 may include at least some devices in one or more processors 601, a memory 602, a communication interface 603, and a bus 604.

The one or more processors 601, the memory 602, and the communication interface 603 are connected to one another through the bus 604. The bus 604 may be a Peripheral Component Interconnect (PCI) bus, an Extended Industry Standard Architecture (EISA) bus, or the like. The bus 604 may be classified into an address bus, a data bus, a control bus, and the like. For ease of representation, in addition, the network device 600 may further include some function modules that are not shown. Details are not described herein.

The processor 601 may be configured to send configuration information to UE through the bus 604, where the configuration information may be used to indicate measurement information of a target resource, the measurement information includes at least one of the following: first measurement behavior, second measurement behavior, and other information, and the configuration information is used to process a received signal by the UE.

In some implementations, the processor 601 may be further configured to receive, through the bus 604, a measurement result of the target resource sent by the UE. The measurement result is reported by the UE according to a measurement result reporting manner indicated by the configuration information and after measuring a target resource of the received signal according to measurement behavior indicated by the configuration information.

The network device provided in this embodiment of this application may send configuration information to UE, where the configuration information is used to indicate measurement information of a target resource, and the measurement information includes at least one of the following: first measurement behavior, second measurement behavior, and other information. Therefore, through receiving the configuration information, the UE can perform different processing behavior on the received signal according to the configuration information, for example, measure the target resource according to the first measurement behavior or the second measurement behavior. In this way, measurement requirements in different scenarios are met.

An embodiment of this application further provides a readable storage medium, where the readable storage medium stores a program or an instruction, when the program or instruction is executed by a processor, the processes in the embodiments of the measurement configuration methods are implemented, and a same technical effect can be achieved. To avoid repetition, details are not described herein again.

The processor is the processor in the UE or the network device in the foregoing embodiments. The readable storage medium includes a computer-readable storage medium, for example, a computer Read-Only Memory (ROM), a Random Access Memory (RAM), a magnetic disk, or an optical disc.

An embodiment of this application further provides a chip. The chip includes a processor and a communication interface. The communication interface is coupled to the processor. The processor is configured to run a program or an instruction, to implement the processes in the embodiments of the measurement configuration methods. To avoid repetition, details are not described herein again.

It should be understood that, the chip mentioned in this embodiment of this application may also be referred to as a system on a chip, a system chip, a chip system, a system-on-chip, or the like.

It should be noted that terms "including," "comprising," or any other variants thereof herein are intended to cover non-exclusive inclusion, so that a process, method, article, or device including a series of elements includes not only those elements but also other elements not explicitly listed, or elements inherent to such a process, method, article, or device. Without more restrictions, the elements defined by the sentence "including a . . . " do not exclude the existence of other identical elements in the process, method, article, or device including the elements. In addition, it should be noted that, the scope of the methods and apparatuses in the implementations of this application is not limited to performing the functions in the order shown or discussed, but may further include performing the functions in a substantially simultaneous manner or in a reverse order depending on the functions involved. For example, the described methods may be performed in an order different from that described, and various steps may be added, omitted, or combined. In addition, features described with reference to some examples may be combined in other examples.

According to the descriptions in the foregoing implementations, a person skilled in the art may learn that the method according to the foregoing embodiment may be implemented by software plus a necessary universal hardware platform, or by using hardware. Based on such an understanding, the technical solutions of this application essentially, or the part contributing to the prior art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods in the embodiments of this application.

The embodiments of this application have been described above with reference to the accompanying drawings, but this application is not limited to the foregoing specific implementations. The foregoing specific implementations are only illustrative and not restrictive. Under the inspiration of this application, without departing from the purpose of this application and the scope of protection of the claims, a person of ordinary skill in the art can still make many forms, which all fall within the protection of this application.

What is claimed is:

1. A measurement configuration method, comprising:
obtaining, by User Equipment (UE), configuration information, wherein the configuration information comprises information used to indicate measurement information of a target resource, the target resource comprises physical layer resources or layer 1 (L1) resources, and the measurement information comprises: a Physical Cell Identifier (PCI); and
processing, by the UE, a received signal according to the configuration information,
wherein the configuration information further comprises:
information indicating a measurement result reporting manner of the target resource; and
information about a second target resource indicated in second information, wherein the second information is used to indicate information related to reporting of a measurement result.

2. The method according to claim 1, wherein the configuration information comprises at least one of the following:
control signaling explicitly indicating measurement behavior, wherein the control signaling is Radio Resource Control (RRC) signaling, or a Medium Access Control Control Element (MAC CE), or Downlink Control Information (DCI);
a configuration manner of the target resource, wherein the configuration manner comprises:
configuring the target resource in a measurement object or configuring the target resource in a physical layer measurement resource; or
information about a first target resource indicated in first information, wherein the first information is used to indicate Quasi-CoLocation (QCL) of a channel or QCL of a reference signal.

3. The method according to claim 1, wherein the processing, by the UE, a received signal according to the configuration information comprises:
measuring, by the UE, a target resource of the received signal according to measurement behavior indicated by the configuration information.

4. The method according to claim 3, wherein after the measuring a target resource of the received signal, the method further comprises:
sending a measurement result of the target resource to a network device according to a measurement result reporting manner indicated by the configuration information, wherein the measurement result reporting manner comprises at least one of the following: layer 1 reporting, layer 2 reporting, or layer 3 reporting.

5. The method according to claim 2, wherein when the configuration information is the information about the first target resource indicated in the first information, measurement behavior for the first target resource is determined through at least one of the following: a measurement result reporting manner of the first target resource, RRC signaling or a MAC CE, or the first information.

6. The method according to claim 2, wherein when the configuration information is the information about the second target resource indicated in the second information, measurement behavior for the second target resource is determined through at least one of the following: a measurement result reporting manner of the second target resource, RRC signaling or a MAC CE, or the second information.

7. The method according to claim 1, wherein the configuration information comprises information about a Synchronization Signal Block (SSB).

8. The method according to claim 1, wherein the measurement information further comprises at least one of the following: first measurement behavior, second measurement behavior, or other information, wherein the first measurement behavior is measuring through a single physical layer or a plurality of physical layers to obtain a measurement result, or performing layer 1 measurement, and
the second measurement behavior is performing filtering on a plurality of physical layer measurement results in a pre-agreed manner to obtain a measurement result, or performing layer 3 measurement.

9. The method according to claim 1, wherein the processing, by the UE, a received signal according to the configuration information comprises:
when the measurement behavior or the other information indicated by the configuration information meets a first preset condition, measuring, by the UE, a target resource of the received signal within a measurement time according to the measurement behavior indicated by the configuration information; or
when the measurement behavior or the other information does not meet a first preset condition, measuring, by the UE, a target resource of the received signal within or outside a measurement time according to the measurement behavior indicated by the configuration information, wherein the measurement time is agreed or configured.

10. The method according to claim 9, wherein the measurement information further comprises at least one of the following: first measurement behavior, second measurement behavior, or other information, wherein that the measurement behavior or the other information indicated by the configuration information meets a first preset condition comprises at least one of the following:
measurement behavior for the target resource is the first measurement behavior or the second measurement behavior;
the target resource is associated with a measurement object, or the target resource is associated with no measurement object;
the target resource is associated with a current serving cell, or a target resource is associated with no current serving cell;
a measurement object associated with the target resource is configured with a Synchronization Signal/Physical Broadcast CHannel block Measurement Timing Configuration (SS/PBCH block Measurement Timing Configuration (SMTC)) or configured with no SMTC;
the configuration information indicating the measurement behavior is a preset type of configuration information;
a type of a reference signal corresponding to the target resource is a preset type;
a measurement result reporting manner associated with the target resource is a preset reporting manner;
control signaling explicitly indicating the measurement behavior also indicates the measurement time, wherein the control signaling is Radio Resource Control (RRC)

signaling, a Medium Access Control Control Element (MAC CE), or Downlink Control Information (DCI);

a configuration manner of the target resource is a preset configuration manner, wherein the preset configuration manner comprises: configuring the target resource in a measurement object or configuring the target resource in a physical layer measurement resource;

information about a first target resource indicated in first information is first preset information, wherein the first information is used to indicate Quasi-CoLocation (QCL) of a channel or QCL of a reference signal; or information about a second target resource indicated in second information is second preset information, wherein the second information is used to indicate information related to reporting of a measurement result.

11. The method according to claim 1, wherein the measurement information further comprises at least one of the following: a measurement frequency, synchronization information, target cell configuration information, or quasi-colocation information.

12. The method according to claim 1, wherein the processing, by the UE, a received signal according to the configuration information comprises:

when a second preset condition is met, performing, by the UE, at least one of the following:

receiving another signal while measuring the target resource;

performing rate matching or puncturing on a signal received during resource measurement;

receiving another signal before or after receiving a measurement signal; or receiving a signal according to a reception time within or outside a predefined range.

13. A measurement configuration method, comprising:

sending, by a network device, configuration information to User Equipment (UE), wherein the configuration information comprises information used to indicate measurement information of a target resource, the target resource comprises physical layer resources or layer 1 (L1) resources, and the measurement information comprises a Physical Cell Identifier (PCI), and the configuration information is used to process a received signal by the UE, wherein the configuration information further comprises: information indicating a measurement result reporting manner of the target resource; and information about a second target resource indicated in second information, wherein the second information is used to indicate information related to reporting of a measurement result.

14. The method according to claim 13, wherein the configuration information comprises at least one of the following:

control signaling explicitly indicating measurement behavior, wherein the control signaling is Radio Resource Control (RRC) signaling, or a Medium Access Control Control Element (MAC CE), or Downlink Control Information (DCI);

a configuration manner of the target resource, wherein the configuration manner comprises: configuring the target resource in a measurement object or configuring the target resource in a physical layer measurement resource; or information about a first target resource indicated in first information, wherein the first information is used to indicate Quasi-CoLocation (QCL) of a channel or QCL of a reference signal.

15. The method according to claim 13, further comprising:

receiving a measurement result of the target resource sent by the UE, wherein the measurement result is reported by the UE according to a measurement result reporting manner indicated by the configuration information and after measuring a target resource of the received signal according to measurement behavior indicated by the configuration information, wherein the measurement result reporting manner comprises at least one of the following: layer 1 reporting, layer 2 reporting, or layer 3 reporting.

16. The method according to claim 14, wherein when the configuration information is the information about the first target resource indicated in the first information, measurement behavior for the first target resource is determined through at least one of the following: a measurement result reporting manner of the first target resource, RRC signaling or a MAC CE, or the first information.

17. The method according to claim 14, wherein when the configuration information is the information about the second target resource indicated in the second information, measurement behavior for the second target resource is determined through at least one of the following: a measurement result reporting manner of the second target resource, RRC signaling or a MAC CE, or the second information.

18. The method according to claim 13, wherein the measurement information further comprises at least one of the following: first measurement behavior, second measurement behavior, or other information, wherein the first measurement behavior is measuring through a single physical layer or a plurality of physical layers to obtain a measurement result, or performing layer 1 measurement, and the second measurement behavior is performing filtering on a plurality of physical layer measurement results in a pre-agreed manner to obtain a measurement result, or performing layer 3 measurement.

19. The method according to claim 13, wherein the measurement information comprises at least one of the following: a measurement frequency, synchronization information, target cell configuration information, or quasi-colocation information.

20. User Equipment (UE), comprising a processor, a memory, and a program stored in the memory and capable of running on the processor, wherein the program is executed by the processor to implement:

obtaining configuration information, wherein the configuration information comprises information used to indicate measurement information of a target resource, the target resource comprises physical layer resources or layer 1 (L1) resources, and the measurement information comprises: a Physical Cell Identifier (PCI); and processing, by the UE, a received signal according to the configuration information, wherein the configuration information further comprises: information indicating a measurement result reporting manner of the target resource; and information about a second target resource indicated in second information, wherein the second information is used to indicate information related to reporting of a measurement result.

* * * * *